US010667497B1

(12) United States Patent
Collins et al.

(10) Patent No.: US 10,667,497 B1
(45) Date of Patent: Jun. 2, 2020

(54) MOBILE CELLULAR COOLING DOOR

(71) Applicants: James Lamar Collins, Lamar, SC (US); Thomas J. Harris, Lamar, SC (US)

(72) Inventors: James Lamar Collins, Lamar, SC (US); Thomas J. Harris, Lamar, SC (US)

( * ) Notice: Subject to any disclaimer, the term of this patent is extended or adjusted under 35 U.S.C. 154(b) by 131 days.

(21) Appl. No.: 15/957,391

(22) Filed: Apr. 19, 2018

Related U.S. Application Data

(60) Provisional application No. 62/487,040, filed on Apr. 19, 2017.

(51) Int. Cl.
A01K 31/02 (2006.01)
F25D 23/02 (2006.01)
A01K 31/20 (2006.01)
F25D 1/02 (2006.01)
E05D 15/06 (2006.01)

(52) U.S. Cl.
CPC .............. A01K 31/02 (2013.01); A01K 31/20 (2013.01); F25D 1/02 (2013.01); F25D 23/021 (2013.01); E05D 15/063 (2013.01); E05D 15/0665 (2013.01); E05Y 2900/132 (2013.01)

(58) Field of Classification Search
CPC ...... A01K 31/02; A01K 31/20; F25D 23/021; F25D 1/02; E05D 15/0665; E05D 15/063
USPC ....................................................... 62/259.4
See application file for complete search history.

(56) References Cited

U.S. PATENT DOCUMENTS

| 1,775,827 | A | * | 9/1930 | Pacyna | E05D 15/063 16/97 |
| 4,424,605 | A | * | 1/1984 | Squires | E05D 15/0652 16/94 R |
| 5,168,832 | A | * | 12/1992 | Price | A01K 31/19 119/302 |
| 6,938,434 | B1 | * | 9/2005 | Fair | F24F 5/0035 261/118 |
| 2007/0107161 | A1 | * | 5/2007 | Hilger | E05F 7/06 16/102 |
| 2008/0308253 | A1 | * | 12/2008 | Knape, Jr. | F24F 5/0035 165/47 |
| 2012/0210739 | A1 | * | 8/2012 | Cobb | F24F 1/58 62/121 |
| 2013/0014531 | A1 | * | 1/2013 | Gass | F24F 5/0035 62/259.4 |

FOREIGN PATENT DOCUMENTS

JP 2001003631 A * 1/2001

* cited by examiner

Primary Examiner — Steve S Tanenbaum
(74) Attorney, Agent, or Firm — P. Jeff Martin; The Law Firm of P. Jeffrey Martin, LLC

(57) ABSTRACT

A mobile cellular cooling apparatus includes frame having a distribution pipe for carrying and distributing water through the pipe and into a plurality of cells. Excess or unevaporated water is collected in trough and recirculated through the apparatus utilizing a reservoir and a pump. Air passes through the cells and achieves a cooling effect on the air temperature while removing contaminants and/or pollutants. One or more of the apparatuses may be included or installed within a poultry house or structure. One or more apparatuses may be included or installed along with other ventilation components to provide an improved ventilation for such structures or buildings.

19 Claims, 9 Drawing Sheets

MOBILE CELLULAR COOLING DOOR

I. RELATED APPLICATIONS

This application claims priority to U.S. Provisional Patent Application No. 62/487,040, filed on Apr. 19, 2017, the disclosure of which is hereby incorporated by reference in its entirety.

II. FIELD OF THE INVENTION

The present application discloses and describes a mobile cellular cooling door.

III. MOTIVATION OF THE INVENTOR

Ventilation apparatuses and systems are important for maintaining appropriate comfort, breathable air, and removing moisture, dust, and airborne organisms in many different applications. In one application, for ventilation systems or apparatuses used for poultry houses, the ventilation system is critical for maintaining appropriate and comfortable temperature levels, for removing excess moisture, circulating fresh air for inhalation, and for diluting dust and/or airborne particles or organisms that can lead to illness, disease, and/or death. Many types of apparatuses and systems have been attempted; however, there remains a need for improved ventilation apparatuses and systems.

IV. SUMMARY

There is a need for developing and using an apparatus, system, and/or method of a mobile cellular cooling apparatus comprising a frame that includes a track runner positioned along the uppermost portion for moving along a track housing affixed to a structure, and means for moving the frame via the runner and the housing; a trough positioned along the lowermost portion; a plurality of rollers positioned immediately below the trough; a plurality of cells interconnected with the trough, the cells positioned within the interior of the frame; a pipe interconnected with the cells; a feed line supplying water to the pipe; a pump interconnected with the feed line and pipe; a reservoir connected to the trough; a valve and a strainer reside between the reservoir and the pipe; a handle connected to the frame; and a source of power delivering electricity to the pump and means for moving the frame.

In one embodiment, a mobile cellular cooling apparatus comprising a trough positioned along the lowermost portion, a plurality of rollers positioned immediately below the trough, a plurality of cells interconnected with the trough, the cells positioned within the interior of the frame, a pipe interconnected with the cells, a feed line supplying water to the pipe, a pump interconnected with the feed line and pipe, a reservoir connected to the trough, a valve and a strainer reside between the reservoir and the pipe, a handle connected to the frame, a source of power delivering electricity to the pump, and means for moving the frame.

The apparatus further comprises a frame that includes a track runner positioned along the uppermost portion for moving along a track housing affixed to a structure. The track housing is fixed against the outside of the building or structure. The track housing comprises a channel for receiving the track runner therein. The track runner and the track housing are interconnected by mechanical means to allow for movement of the runner relative to the housing. The mechanical means comprise mechanical gears that urge the runner along the housing.

It is envisioned that each one of the cells positioned within the interior of the frame comprise a plurality of cardboard corrugated folds permeable to air flow, wherein each one of the cells is operatively coupled with adjacent cells within the interior of the frame. Each cell receives water from the distribution pipe, wherein the distribution pipe comprises a plurality of perforations along its length for distributing water to the cells. The distribution pipe comprises a generally vertically-oriented pipe interconnected with a generally horizontally-oriented pipe. The apparatus further comprising a removable end cap at the junction of the vertical and horizontal pipe interconnection. The apparatus further comprises a removable end cap disposed at the opposing end of the pipe.

The apparatus further comprises at least one hinge for moving the apparatus between a closed position and an opened position.

There is also a need for a ventilation system for a poultry house, the ventilation system comprising: a mobile cellular cooling apparatus installed at one end of the poultry house; and a fan for moving air through the poultry house and through the cells of the mobile cellular cooling apparatus.

Within the system, the apparatus and its components are consistent with the previously described summary of the individual elements and components disclosed above.

V. BRIEF DESCRIPTION OF THE DRAWING(S)

VI. DESCRIPTION OF THE EMBODIMENT(S)

Figure 1:
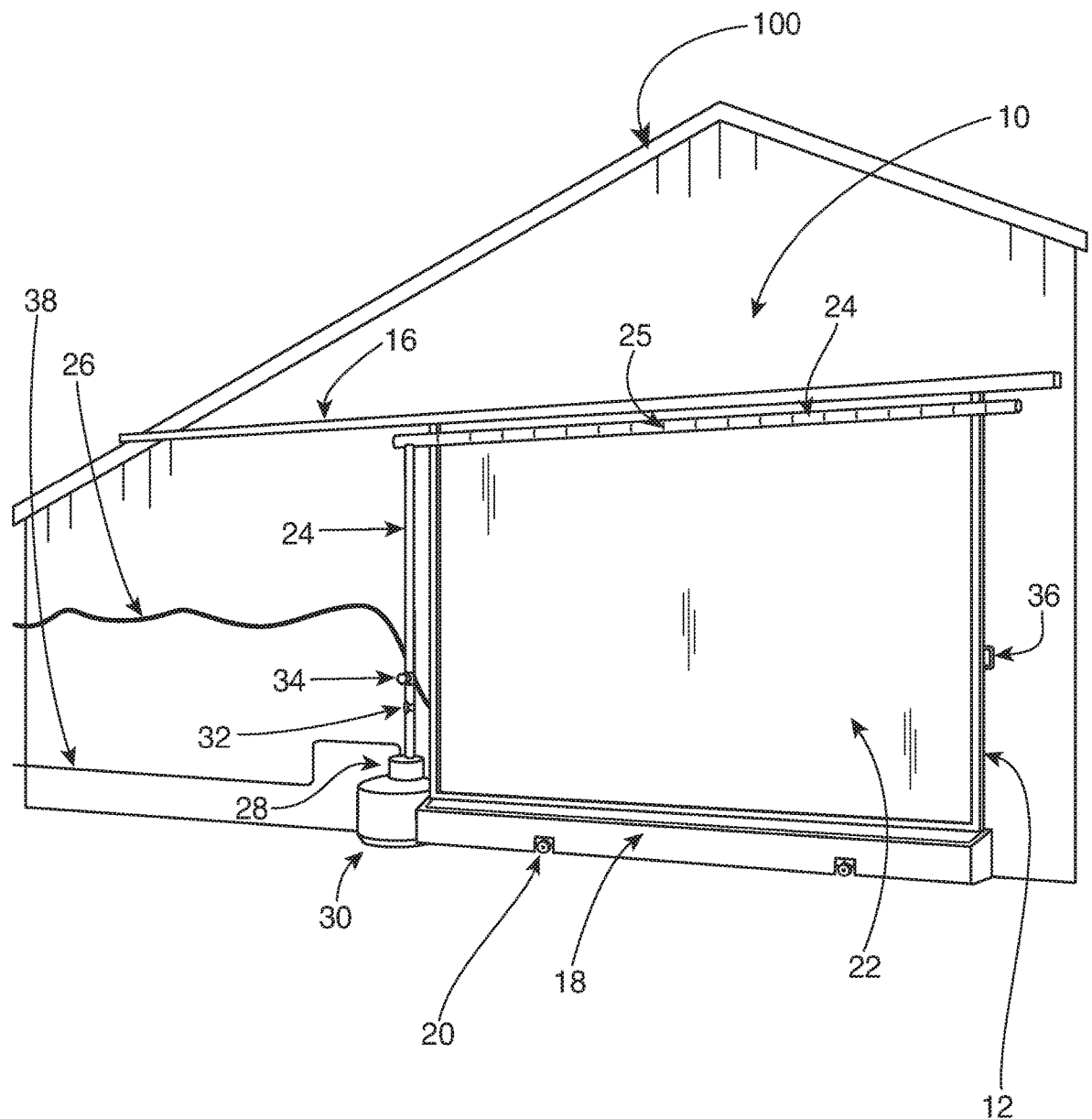
FIG. 1 is a side-view of a mobile cellular cooling apparatus installed on a poultry house.
Figure 2:
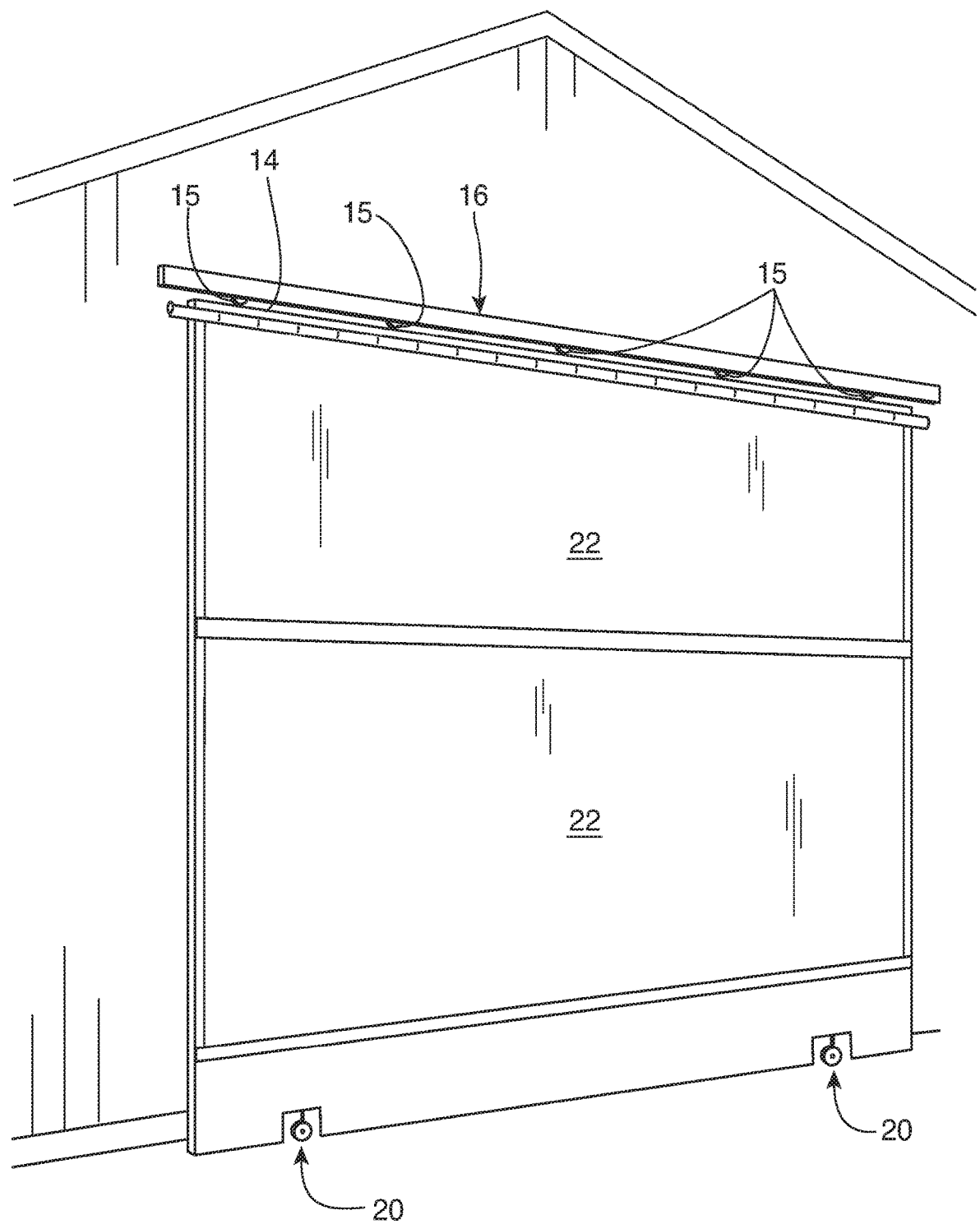
FIG. 2 is a side-view of the apparatus installed on a poultry house in an opened position.
Figure 3:
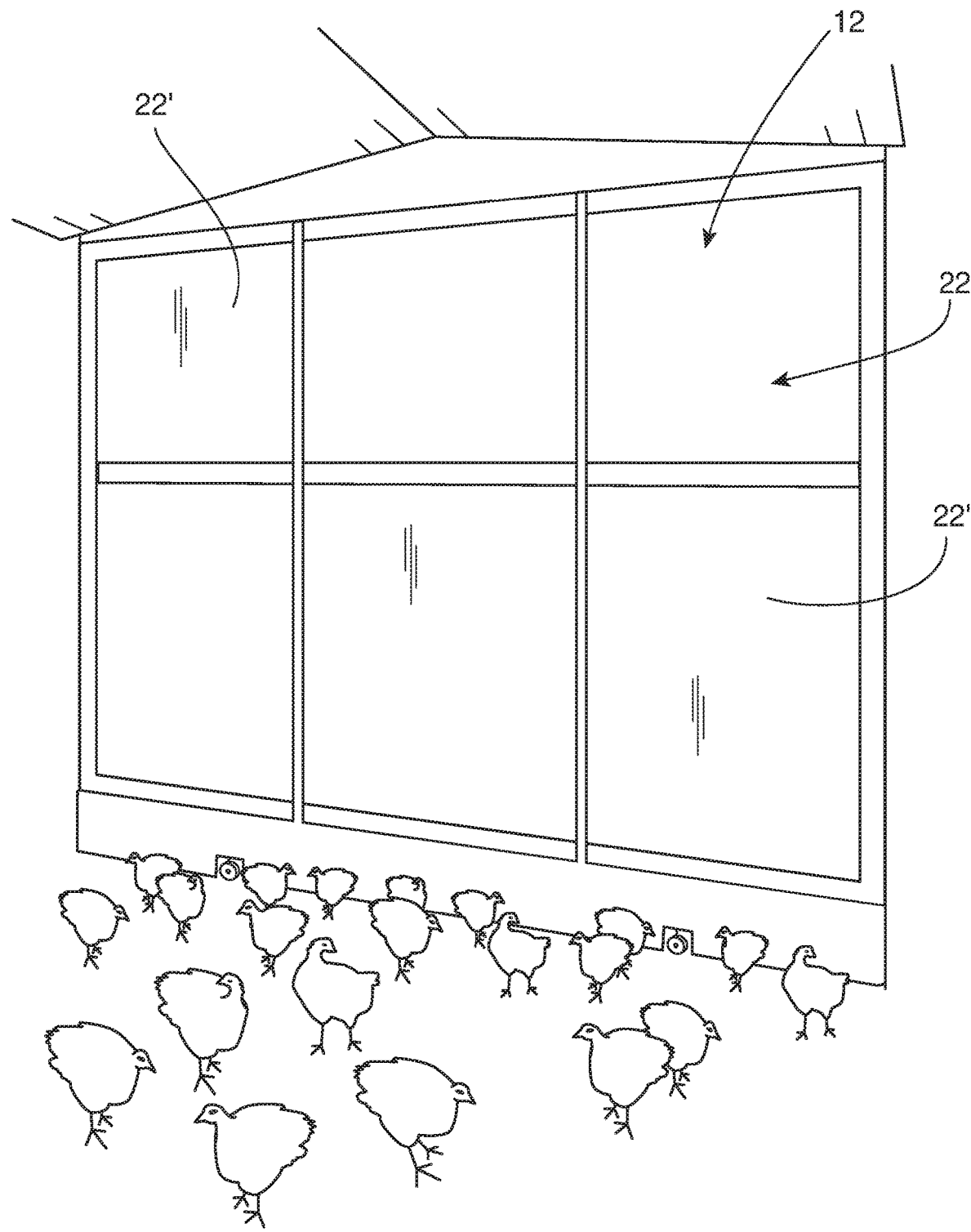
FIG. 3 is an interior view of the frame, plurality of cells, and individual cells comprising part of the apparatus.
Figure 4A:
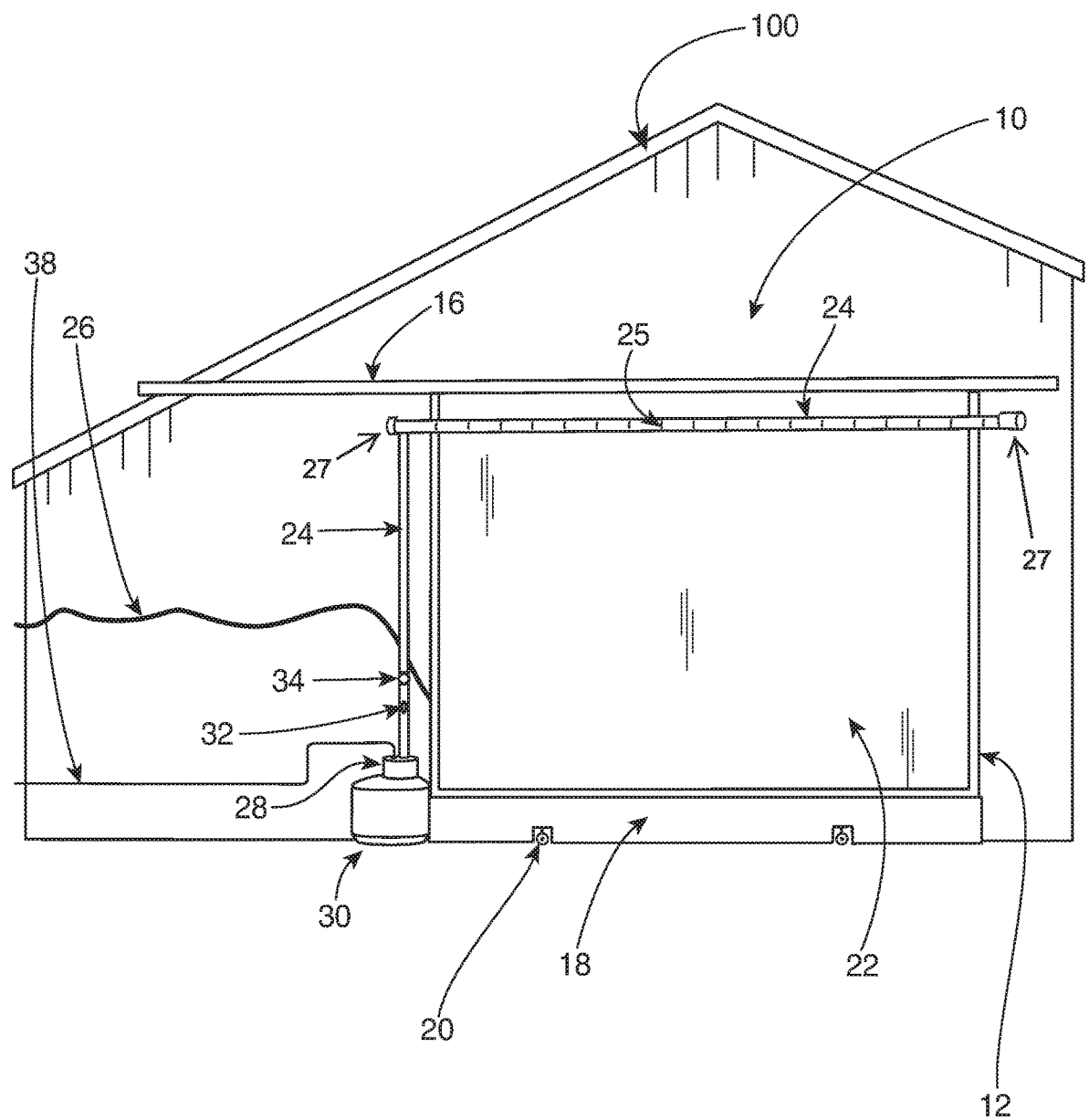
FIGS. 4a-4c are multiple views of the apparatus and system consistent with the description herein.
Figure 4B:
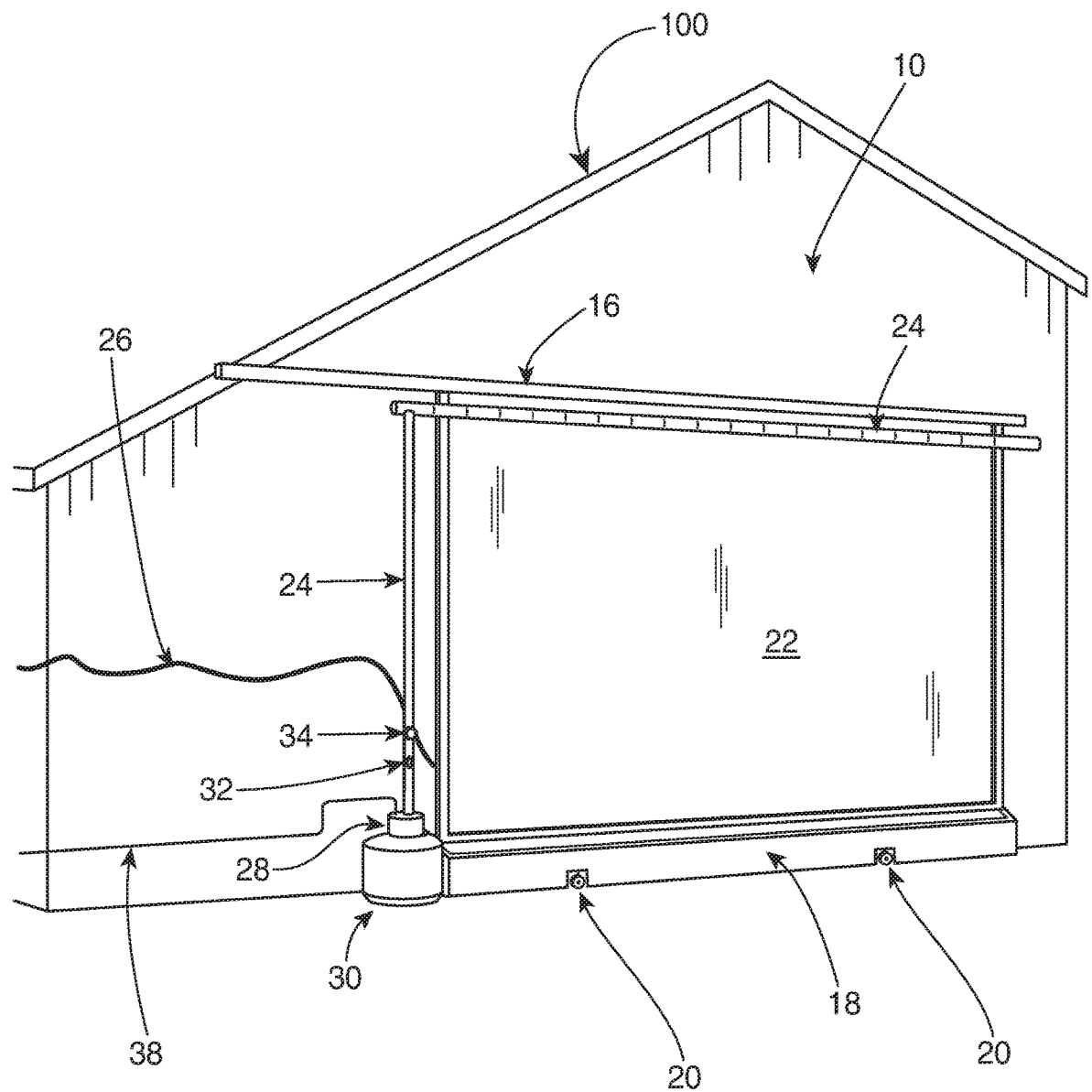
Figure 4C:
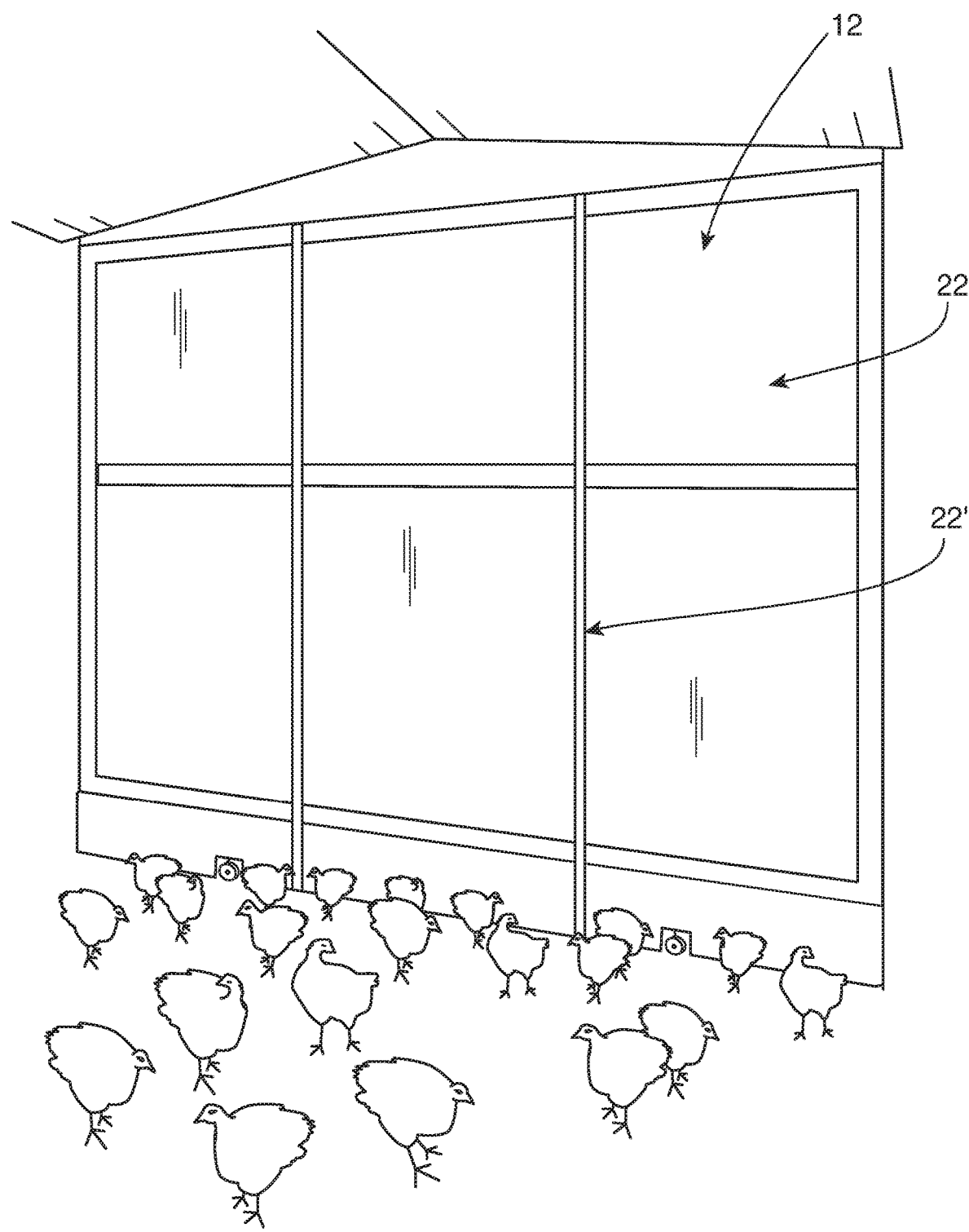

In accordance with the drawings illustrating at least one embodiment of a mobile cellular cooling apparatus 10, of which one or more apparatuses 10 may be included or incorporated into a broader ventilation system 100, more fully explained and described herein. A cover may be optionally included to cover the apparatus 10 and/or the opening left by the apparatus 10 when placed in an opened position.

The apparatus 10 comprises a frame 12 (or optionally a panel within a frame). The frame 12 includes a track runner 14 positioned along the uppermost portion for sliding or moving along a track housing 16. Optionally, a rod or a plurality of rollers or casters 15 may be provided or included for facilitating movement of the frame 12 in conjunction with the runner 14 and housing 16. The frame 12 also includes a trough 18 positioned along the lowermost portion.

A plurality of rollers or casters 20 are positioned immediately below the trough 18 to assist in moving the frame 12.

Along the interior of the frame 12 are a plurality of cells 22 that are interconnected with the trough 18. A pipe 24 is configured and interconnected with the cells 22. A feed line 26 supplies water to the pipe 24. A pump 28 is interconnected with the feed line 26 and pipe 24 and provides the apparatus 10 with the necessary power and force to assist in pushing water through the apparatus 10. A reservoir 30 is connected to the trough 18 to receive unused water for recirculation back into the system 10. In one embodiment, the pump 28 and reservoir 30 are separate components interconnected for operation. In another embodiment, the pump 28 is a component within the reservoir 30.

A valve 32 and strainer 34 reside between the reservoir 30 and the pipe 24, completing the closed water loop. The frame 12 may include a handle (or handles) 36 to assist with movement of the frame 12. The apparatus 10 is powered by a source 38 to provide electricity to the pump 28 and for moving the frame 12 from closed-to-opened and opened-to-closed.

The distribution pipe 24 may have a variety of configurations. In one embodiment, and consistent with the illustration(s) included herewith, the distribution pipe 24 includes a generally vertically-oriented pipe that is interconnect with a generally horizontally-oriented pipe. At the junction of the vertical and horizontal pipe interconnection, a removable end cap 27 may be provided for accessing the interior of the pipe 24 and for draining the pipe 24 and its components of any water, solid, sediment, or general residue. Similarly, at the opposing end, a terminus is formed with a removable end cap 27 similar to that described above and for similar purpose(s).

Each one of the cells 22' comprising the plurality of cells 22 is generally similar in construction, arrangement, and function. Each cell 22' comprises a plurality of cardboard corrugated folds. Each cell 22' is permeable to air flow. Each cell 22' receives water from the distribution pipe 24. Each cell 22' is operatively coupled with adjacent cells 22' along multiple sides thereof. The distribution pipe 24 comprises a plurality of perforations and/or apertures 25 along its length. Each of the perforations or apertures 25 is in fluid communication with a cell 22'. Through the combination of the pump 28 and gravity, water is ushered through the distribution pipe 24 and distributed to the plurality of cells 22' via the perforations or apertures 25.

Relying in part on gravity, the water will pass through each cell 22 and eventually exit the cell(s) 22 into the trough 18 positioned at the lowermost portion of the frame 12. As air flows through each cell (and the plurality of cells 22 as a combination), the combination of air flow and cool water function to deliver cooler air to the interior of the ventilated building or structure. By reducing the heat in the building or structure, dust and airborne particles may be diluted and/or removed, moisture is reduced, and odor(s) removed or reduced. As indicated, the trough 18 and reservoir are operatively and fluidly interconnected. The previously distributed water is filtered through the cells 22 and then collected via the trough 18 and introduced into the reservoir 30.

Once the water is collected in the reservoir 28, the pump 28 forces the water through the strainer 34 and back into the distribution pipe 24 and then to the cells 22 for recirculation. The strainer 34 may have a variety of configurations. In one embodiment, the strainer 34 may comprise an in-line filter for removing sediment, particulates, impurities, and/or combination(s) thereof. By including an in-line strainer 34, the water is continuously filtered and purified for the benefit of the poultry, removing the contaminants that are collected as air is passed through the cells 22.

Figure 7:
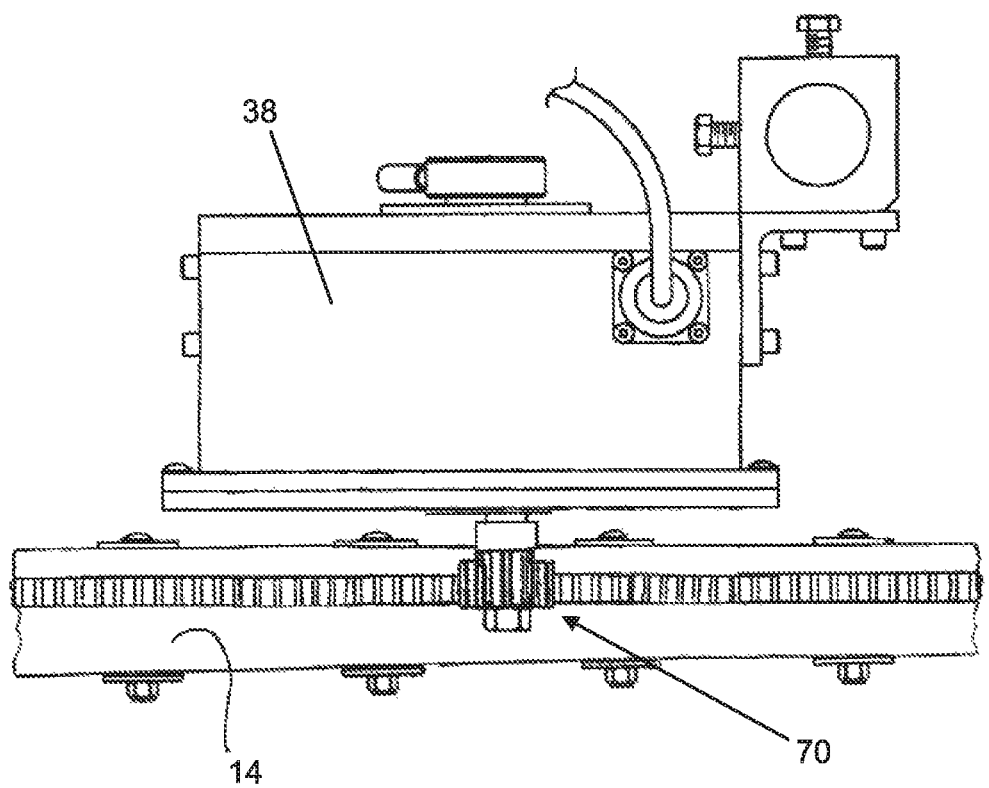
FIG. 7 is a top plan view of the track runner depicting gears for urging the track runner along the housing of the mobile cellular cooling apparatus, in accordance to another embodiment of the present invention.

The track runner 14 and track housing 16 may comprise a variety of configurations, components, and elements. In one embodiment, the track housing 16 is fixed against the outside of the building or structure. The track housing 16 may include a channel for receiving the track runner 14 therein. The channel would partially surround the track runner 14, thereby preventing the track runner 14 from inadvertently separating from the track housing 16. It is envisioned that the track runner 14 and track housing 16 may be passive in the closed-to-opened and opened-to-closed movements of the frame 12, in that power may be applied to the rollers or casters 20 or other device or component to force movement and causing the track runner 14 to ride or move within the track housing 16 in response. It is separately envisioned that the track runner 14 and/or the track housing 16 may be interconnected by means to allow for movement of the runner 14 relative to the housing 16 or vice versa. For example, the runner 14 and/or housing 16 may be connected via teeth, gears 70 (as shown in FIG. 7), or other interconnected components so that the runner 14 may be urged along the housing 16.

Figure 5:
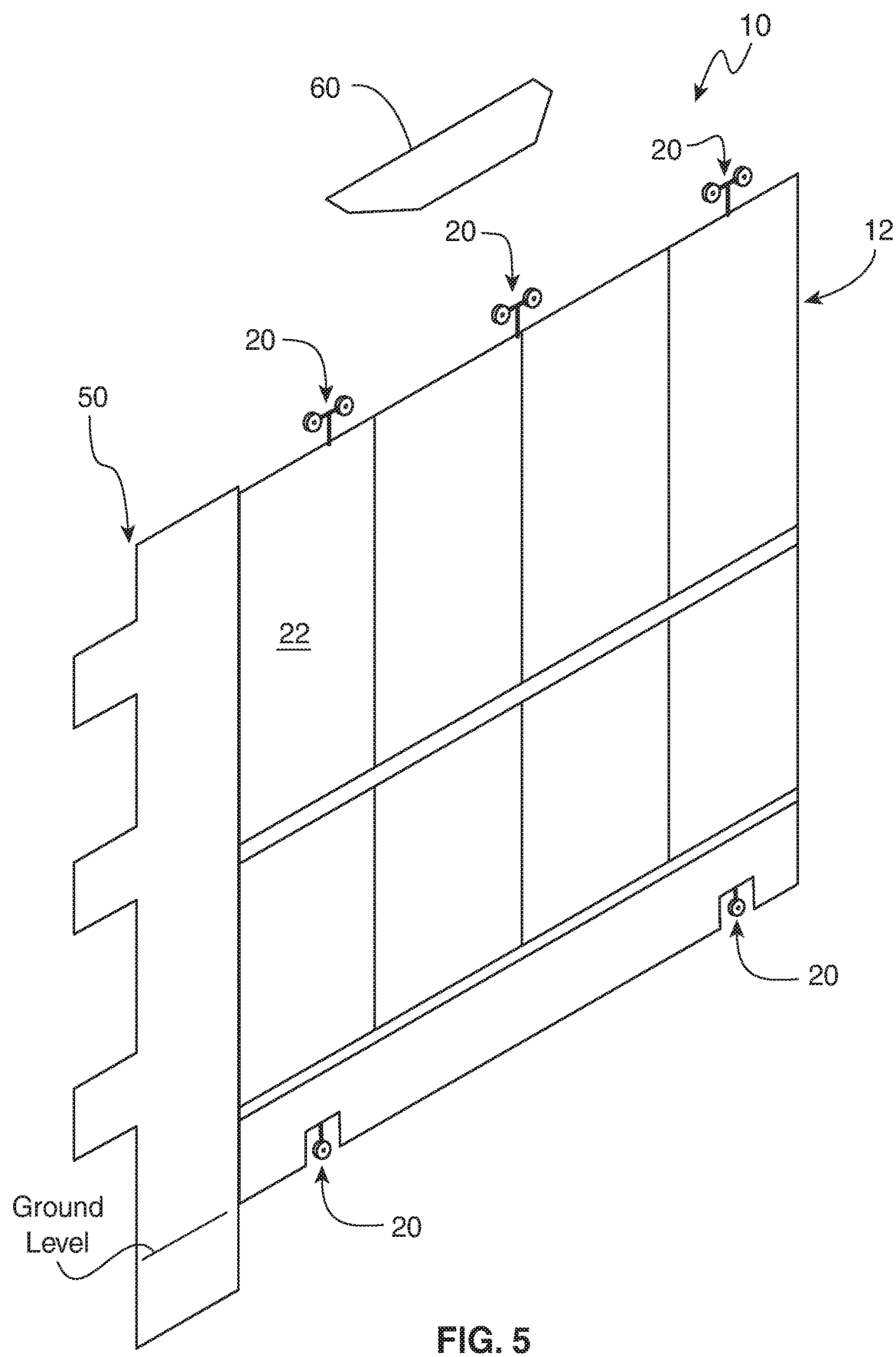
FIG. 5 is a perspective view of an alternative embodiment of the mobile cellular cooling apparatus.
Figure 6:
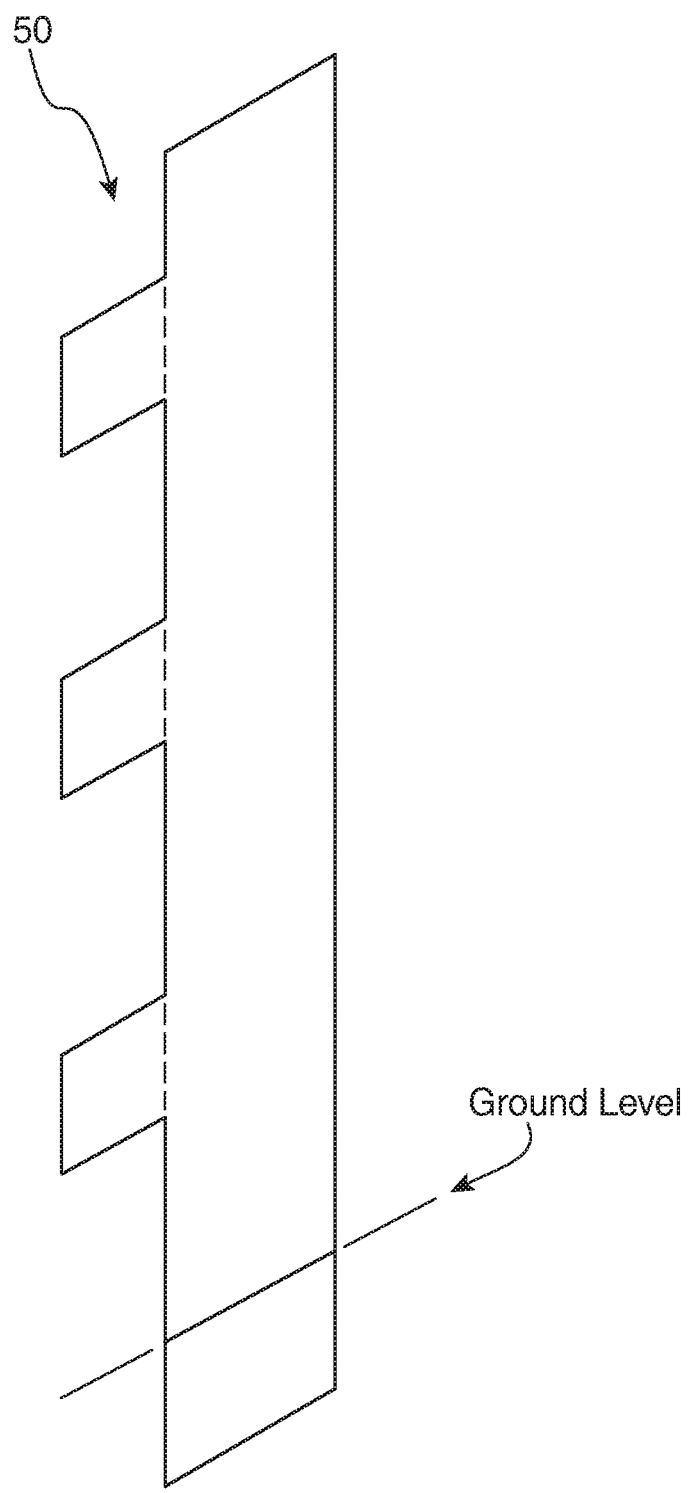
FIG. 6 is a perspective view of the hinge(s) incorporated as part of the alternative embodiment depicted in FIG. 5.

In another embodiment, consistent with FIGS. 5 and 6, it is envisioned that the apparatus 10 (or system 100) may include at least one hinge 50. The hinge(s) 50 may be used to replace the track runner 14 and housing 16 elements, whereby a user can open and close the apparatus 10 along the articulation of the hinge(s) 50 included herein as opposed to the lateral sliding motion and rollers used in a prior embodiment. It is also envisioned that the hinge(s) 50 may be incorporated with the existing runner 14 and housing 16 elements to provide dual means for moving and/or opening/closing the apparatus 10. In replacing the runner 14 and housing 16, a plurality of casters 20 may be included along the top and the bottom of the apparatus 10 to facilitate movement of the apparatus 10 in one or more directions. A brace 60 may be included overhead to assist in alignment and support of the apparatus 10.

It is further envisioned that the mobile cellular cooling apparatus 10 may be installed with other ventilation components, including one or more additional mobile cellular cooling apparatus(es) 10 consistent with the apparatus 10 described above, thereby forming or comprising a ventilation system 100. Thus, in one embodiment, a poultry house ventilation system 100 may comprise the mobile cellular cooling system 10 integrated with a poultry house or structure as described above. Moreover, in another embodiment, a poultry house ventilation system 100 may comprise a plurality of mobile cellular cooling systems 10 as described above. In another embodiment, a poultry house ventilation system 100 may comprise one or more mobile cellular cooling systems 10 in combination with one or more motorized fans or other means for pushing, or pulling, or pushing and pulling air through the poultry house structure. Other combinations and sub-combinations are envisioned, as well.

It is further envisioned that one of the mobile cellular cooling apparatuses 10 may be installed at one end of the poultry house structure, and at least one motorized fan is installed away from the apparatus 10 area or end of the structure. In this configuration, the fan is capable of forcing air either away from or toward the apparatus 10, drawing or forcing cooler and cleaner air through the poultry house structure. It is also envisioned that multiple fans may be similarly installed to achieve increased air movement as measured by cubic feet per minute (CFM). In yet another configuration, multiple apparatuses 10 may be installed and multiple fans may be installed, which may also then use baffling, channeling, and/or curtains to separately channel air through certain defined areas of the poultry house and optimize the cooling and air sanitization and/or purification process. Likewise, similar configurations utilizing multiple apparatuses 10 and fans are envisioned.

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations.

Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

What is claimed is:

1. A mobile cellular cooling apparatus comprising:
a frame comprising a plurality of cells positioned within an interior of the frame;
a trough positioned along a lowermost portion of the frame, the plurality of cells interconnected with the trough;
a plurality of rollers positioned immediately below the trough;
a pipe interconnected with the cells;
a feed line supplying water to the pipe;
a pump interconnected with the feed line and the pipe;
a reservoir connected to the trough;
a valve and a strainer residing between the reservoir and the pipe;
a handle connected to the frame;
a source of power delivering electricity to the pump; and
means for moving the frame.

2. The apparatus of claim 1, wherein the frame further comprises a track runner positioned along an uppermost portion thereof for moving along a track housing affixed to a structure.

3. The apparatus of claim 2, wherein the track housing is fixed against an outside of the structure.

4. The apparatus of claim 3, wherein the track housing comprises a channel for receiving the track runner therein.

5. The apparatus of claim 4, wherein the track runner and the track housing are interconnected by a mechanical means to allow for movement of the runner relative to the housing.

6. The apparatus of claim 5, wherein the mechanical means comprise mechanical gears that urge the track runner along the housing.

7. The apparatus of claim 1, wherein each one of the cells positioned within the interior of the frame comprise a plurality of cardboard corrugated folds permeable to air flow, wherein each one of the cells is operatively coupled with adjacent cells within the interior of the frame.

8. The apparatus of claim 7, wherein each cell receives water from the distribution pipe, wherein the distribution pipe comprises a plurality of perforations along its length for distributing water to the cells.

9. The apparatus of claim 7, wherein the distribution pipe comprises a generally vertically-oriented pipe interconnected with a generally horizontally-oriented pipe.

10. The apparatus of claim 9 further comprising a removable end cap at a junction of the vertical and horizontal pipe interconnection.

11. The apparatus of claim 10 further comprising a removable end cap disposed at an end of the distribution pipe opposing the junction.

12. The apparatus of claim 1 further comprising at least one hinge for moving the apparatus between a closed position and an opened position.

13. A ventilation system for a poultry house, the ventilation system comprising:
a mobile cellular cooling apparatus installed at one end of the poultry house, the mobile cellular cooling apparatus comprises;
a frame comprising a plurality of cells positioned within an interior of the frame;
a trough positioned along a lowermost portion of the frame, the plurality of cells interconnected with the trough;
a plurality of rollers positioned immediately below the trough;
a pipe interconnected with the plurality cells;
a feed line supplying water to the pipe;
a pump interconnected with the feed line and the pipe;
a reservoir connected to the trough;
a valve and a strainer, the valve and the strainer residing between the reservoir and the pipe;
a handle connected to the frame;
a source of power delivering electricity to the pump; and
means for moving the frame; and
a fan for moving air through the poultry house and through the cells of the mobile cellular cooling apparatus.

14. The system of claim 13, wherein the frame further comprises a track runner positioned along an uppermost portion thereof for moving along a track housing affixed to a structure, the track housing is fixed against an outside of the structure and comprises a channel for receiving the track runner therein, and whereby the track runner and the track housing are interconnected by mechanical means to allow for movement of the track runner relative to the track housing.

15. The system of claim 13, wherein each one of the cells positioned within the interior of the frame comprise a plurality of cardboard corrugated folds permeable to air flow, wherein each one of the cells is operatively coupled with adjacent cells within the interior of the frame.

16. The system of claim 13, wherein each cell receives water from the distribution pipe, wherein the distribution pipe comprises a plurality of perforations along its length for distributing water to the cells.

17. The system of claim 13, wherein the distribution pipe comprises a generally vertically-oriented pipe interconnected with a generally horizontally-oriented pipe.

18. The system of claim 17 further comprising a removable end cap at the junction of the vertical and horizontal pipe interconnection.

19. The system of claim 13 further comprising at least one hinge for moving the apparatus between a closed position and an opened position.

\* \* \* \* \*